April 22, 1969 G. H. JANTZEN 3,439,952
SEAT BELT RETRACTOR
Filed Dec. 11, 1967 Sheet 1 of 3
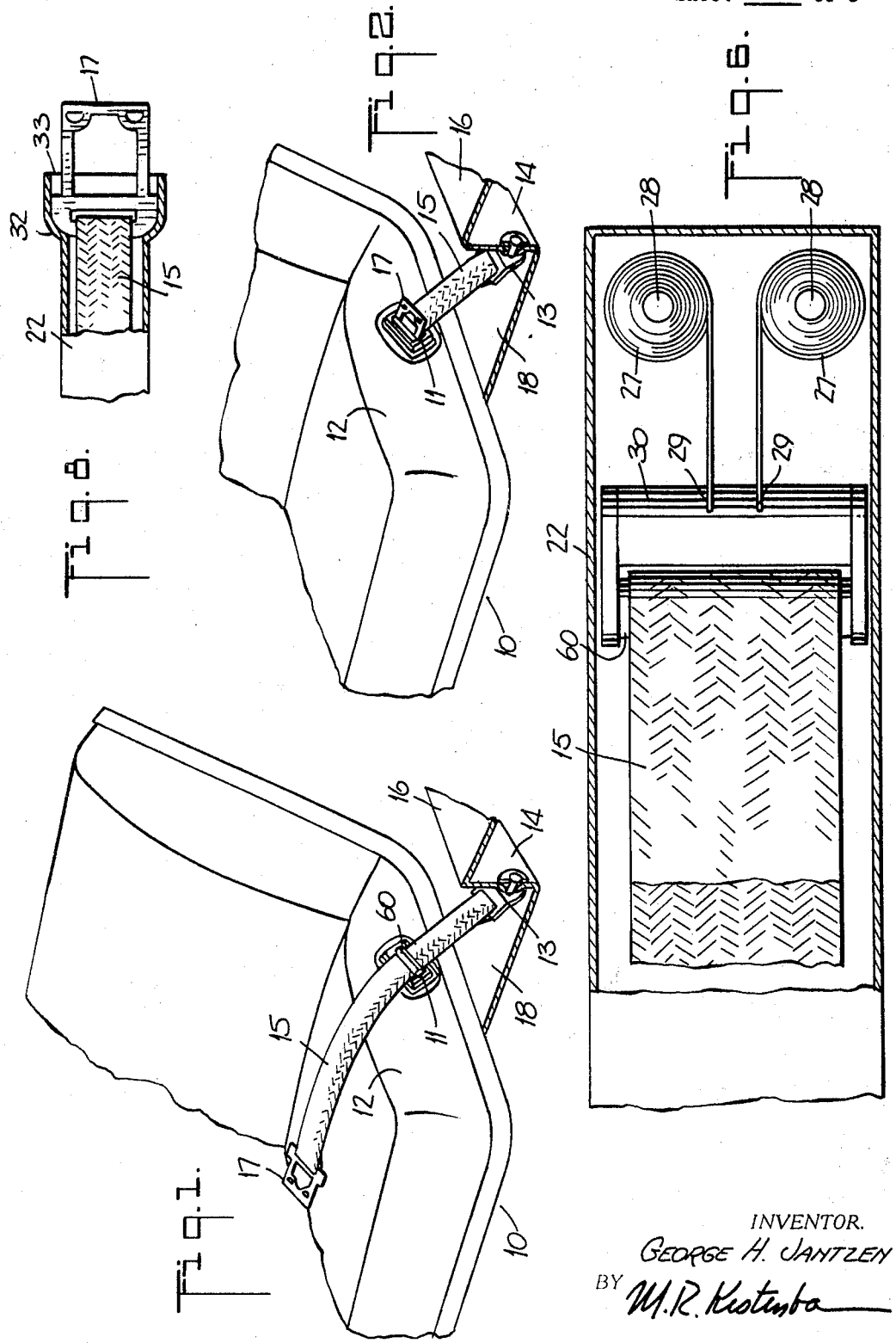
INVENTOR.
GEORGE H. JANTZEN
BY M. R. Kustumba
ATTORNEY

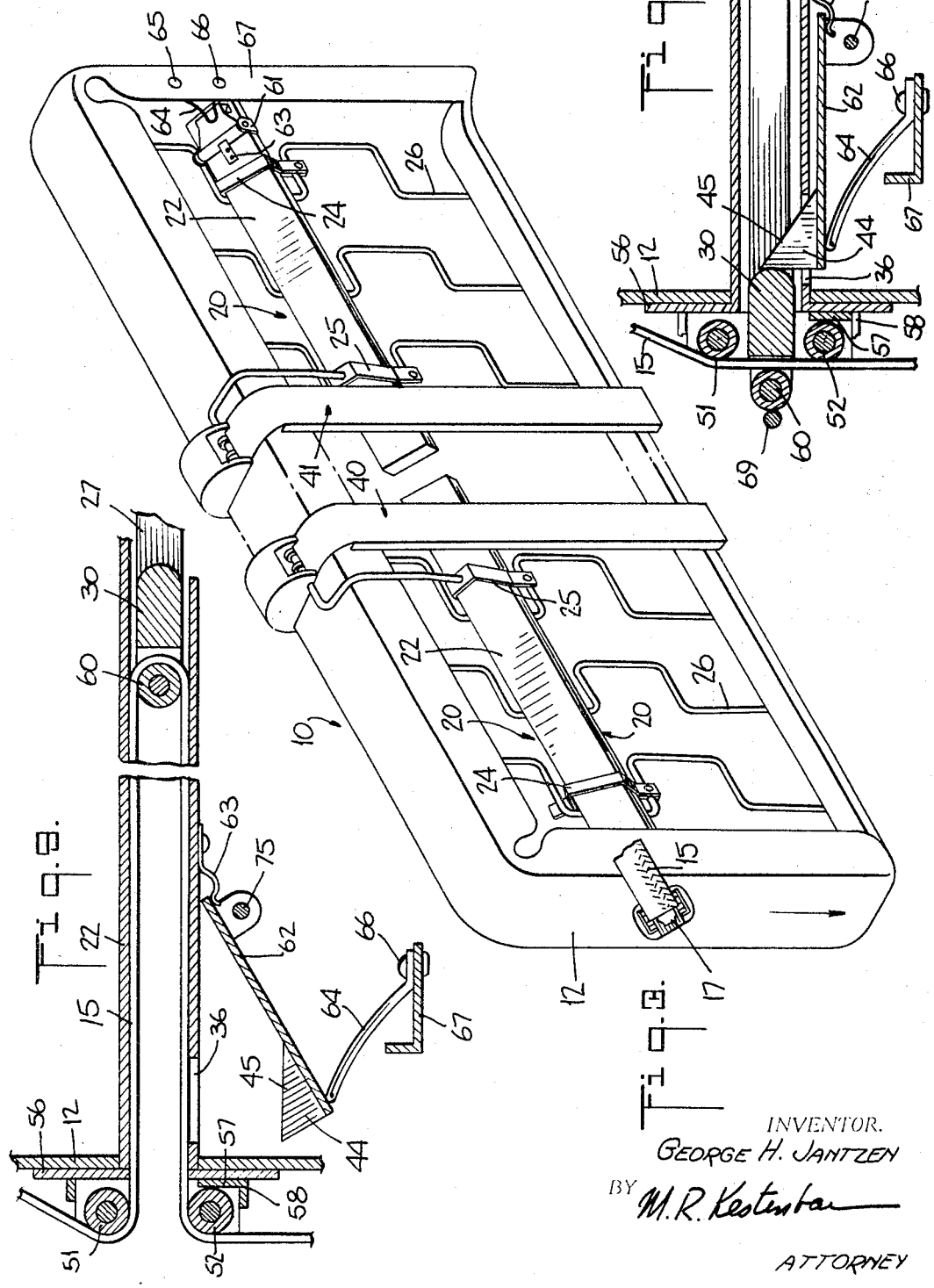

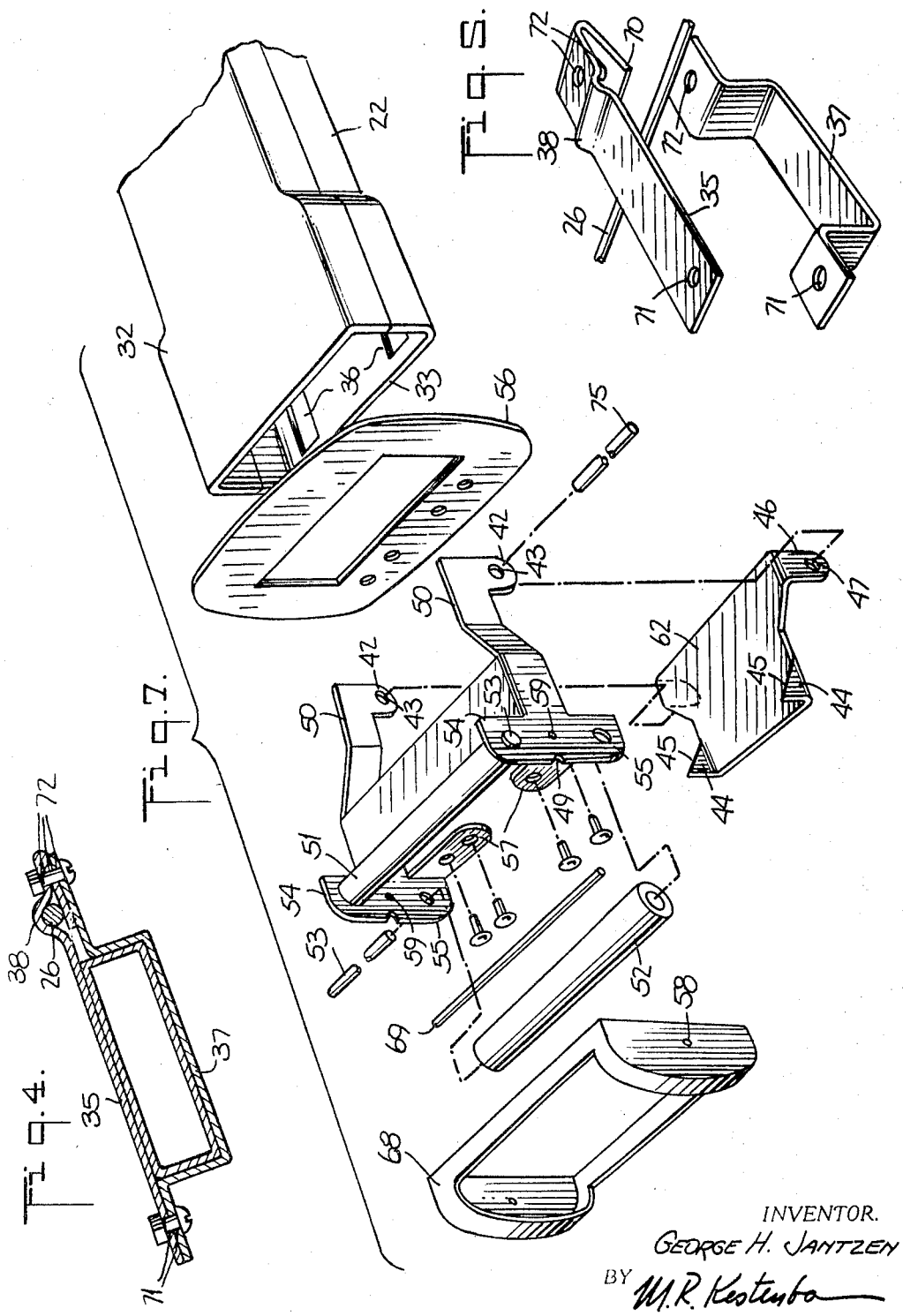

United States Patent Office 3,439,952
Patented Apr. 22, 1969

3,439,952
SEAT BELT RETRACTOR
George H. Jantzen, New York, N.Y., assignor to M. Steinthal & Company Incorporated, New York, N.Y., a corporation of New York
Filed Dec. 11, 1967, Ser. No. 689,447
Int. Cl. B60r *21/10*; A62b *35/02*
U.S. Cl. 297—388                    19 Claims

ABSTRACT OF THE DISCLOSURE

An elongated housing containing a slide, mounted to the springs within the seat to ride up and down therewith and communicating at an open end to an opening in the seat side. The slide is locked in position partially extending through the seat side when a dog-ended member attached to and beneath the housing is pivoted upwards relative to the housing. A resilient arm is attached to a fixed portion of the seat and contacts the underside of the dog-ended member to pivot the member upwards when the housing moves downward in response to pressure on the seat.

---

This invention relates to seat belt retractors and more particularly to retractors which operate to remove the seat belt from the seat automatically when the pressure is removed from the seat.

Typical present day retractors are located either on the seat or in the vicinity of the belt anchor at the vehicle floor. These retractors operate by rolling the belt about a central pin through the action of a pair of spring loaded arms. On-the-seat retractors roll the belt into a large roll which rests on the seat when not in use. Off-the-seat retractors roll the belt into a plastic housing which extends upwards from the vehicle floor at the belt anchor which is located at the side of the seat, to its rear or slightly behind it. In 2-door vehicles, these retractors present an obstacle to entering or leaving the rear seat.

Both of these retractor types are constantly pulling. The wearer is always aware of the pull of the retractor on the belt against him. Besides this physical discomfort, constantly pulling retractors may present a more serious safety problem. The wearer, on occasion, may mistake the pull on the belt as an indication that the belt is fully extracted—a condition that is indispensable for safe use. Or more likely, the wearer, on occasion, will forget to extract the belt fully from the retractor before buckling it about him and adjusting it to size.

Another disadvantage of a constantly pulling retractor which is associated with both convenience and with safety relates to any number of situations which can arise which will prompt the wearer to open the buckle for a short period without intending to leave the seat while the vehicle is in motion. Much to his annoyance and distraction, he then finds that the belt has departed and now resides someplace behind him on the seat—or worse still, off the side and to the rear of the seat.

Accordingly, it is an object of the present invention to provide a seat belt retractor which retracts the belt to a hidden position—neither on or off to the side of the seat.

Another object of this invention is to provide a retractor which discontinues to pull on the belt when the belt is fully extracted but which will retract the belt automatically when the passenger leaves the seat.

A further object of this invention is to provide a retractor which alerts the passenger to the fact that the belt is not fully extracted to avoid creating a dangerous use condition.

Still another object of this invention is to provide a retractor contained entirely within the envelope of the seat and which will position the buckle member so that a portion of it extends from out of the side of the seat to be conveniently and reliably grasped by the passenger each time.

These objects are accomplished in the present invention by a retractor of elongated box-like construction open at one end and having a slide arranged for reciprocal movement in the retractor and biased in the direction away from the opening by a constant tension spring. The belt is looped about the slide and is drawn into the retractor as the slide moves away from the opening. The retractor is mounted to the flexible springs within the seat to ride up and down with the springs in response to pressure on the seat, is oriented laterally with respect to the forward direction of the seat and terminates at a slotted opening in the side of the seat. A simple dog-type locking mechanism is pivotably mounted to the retractor at the opening and within the seat. This locking mechanism is biased to pivot downward and away from the retractor. A resilient arm is mounted to a fixed portion of the seat below the locking mechanism and as the retractor rides downward in response to pressure on the seat the resilient arm forces the locking mechanism to pivot upward relative to the retractor. In this position, the locking mechanism will act as a stop to prevent the return of the retractor slide once it has been pulled past the locking mechanism to the opening in the side of the seat by extracting the belt. Thereby, the pull of the retractor is removed from the belt and the belt will remain fully extracted so long as the pressure of the passenger remains on the seat. When the pressure is removed, the slide is released and the belt is automatically retracted from the seat.

These and other objects and features of the present invention will be fully understood from the following description taken together with the drawings in which:

FIGURE 1 is a perspective view of a vehicle seat with the seat belt fully extracted, FIGURE 2 is a similar perspective view of the vehicle seat with the seat belt retracted, FIGURE 3 is a perspective view of the vehicle seat as seen from the bottom and showing the retractors in position, FIGURE 4 is a sectional view of the clamp which holds the retractor to the seat, FIGURE 5 is an exploded view of the clamp, FIGURE 6 is a plan view of the spring retractor mechanism of the retractor, FIGURE 7 is an exploded view of the automatic mechanism for locking out the pull of the retractor, .

FIGURE 8 is a sectional view of the end of the retractor housing showing the buckle member in its retracted position, FIGURE 9 is a sectional view of the retractor locking mechanism in the absence of pressure on the seat, and FIGURE 10 is a sectional view of the retractor locking mechanism in the presence of pressure on the seat.

Referring now to FIGURE 1, a vehicle seat, shown generally at 10, has a slotted portion 11 in the outboard side 12 thereof. An anchor 13 is rotatably secured by conventional fastening means to the sloping surface 14 between the floor level 16 at the vehicle door and the lower level 18 of the vehicle floor beneath the seat. The anchor 13 is bent slightly away from the sloping surface 14 and the belt 15 extends from a slot in this bent portion and passes upwards along the outboard side 12 to be engaged at the slotted portion 11 by the roller 60 of a seat belt retractor which is contained within the seat. The belt 15 continues upwards past the slotted portion 11 along the outboard side 12 and onto the seat cushion, ready for use. This is the extracted position for the belt and the retractor. The important natural path of the belt 15 from the anchor 13 to the buckle tongue 17 is maintained by the angular orientation of the slotted portion 11 relative to the vehicle floor. This angular orientation of the center line of the slotted portion 11 to the horizontal may range between 20° and 45°.

FIGURE 2 shows the belt in the retracted position. The belt 15 extends from the rotatable anchor 13, enters the slotted portion 11 and is taken up doubled within the retractor within the seat so that only the end of buckle tongue 17 extends out of the outboard side. The tongue 17 is ready to be conveniently gripped by a passenger and pulled up onto the seat for use. When the passenger leaves the seat, the retractor senses this change of condition and automatically pulls the belt off of the seat to the position shown in FIGURE 2.

Referring to FIGURE 3, the seat 10 is shown upended, disclosing the outboard retractors, shown generally at 20 and the flat seat springs 26 to which they are attached. The forward direction of the seat is denoted by the downward arrow. The seat 10 shown is the bench type which extends across the interior width of the vehicle and is intended to seat two or three passengers.

The present invention is described in connection with outboard retractors 20. It should be understood that each outboard retractor acts upon only one of a pair of belt halves. Advantageously, the other belt half, in this case the inboard half is also automatically retracted from the seat by retractors, here shown generally at 40 and 41. One retractor well suited for this purpose is described in my U.S. Patent No. 3,262,738. Alternatively, the retractors of the present invention may be adapted for inboard use.

The retractors 20 is each an elongated box-like housing 22 open at the end closest to the seat side 12. The retractors are oriented laterally with respect to the forward direction of the seat 10. A bracket 61 is fastened over the open end of each retractor housing 22 adjacent to the slotted portion 11 in the seat side 12. A locking member 62 is pivotably attached to the bracket 61 and is biased to pivot downward by a spring 63. A resilient spring arm 64 is attached at two places 65, 66 by conventional fastening means to a vertically fixed structural member 67 of the seat 10. The cooperation of the locking member 62 and the resilient arm 64 will be described in connection with FIGURES 9 and 10.

The retractor housings 22 are fastened to flexible seat springs 26 which are formed of a series of right angle bends and are slightly curved to produce the familiar contour of the seat cushion. The type of seat springs are not critical and the retractors of the present invention can be adapted to fasten to other seat spring configurations. The retractor housings 22 connect with the slotted portions 11 in the seat sides 12 as will be described in connection with FIGURE 7. As a result, each retractor 20 is oriented about its longitudinal centerline to match the orientation of the slotted portion 11. This is accomplished by the clamps 24, 25 which secure the retractor to the seat springs 26.

Significantly, as suspended from the seat springs 26, the retractor 20 is positioned entirely within the envelope of the seat 10, hidden from view and occupying otherwise unused space. The retractor 20 is easy to install by the simple expedient of tightening the clamps 24, 25 to the springs 26 in an area which typically is unencumbered by interfering elements of the seat.

Equally significantly, the retractor 20 is free to ride up and down with the seat springs 26 in response to pressure on the seat.

The arrangement of the clamps 25, 26 are presented in FIGURES 4 and 5. Each clamp is comprised of a retainer 35 and a clamping member 37 plus conventional fastening means. The retainer 35 is positioned above the spring 26 and has an indented portion 38 which fits about an individual rod of spring 26 and a rod clamping portion 70 which is tightened down upon the rod to hold the retainer 35 in the selected axial orientation at the place selected for clamping. This provides the angular orientation to the retractor housing 22 to coincide with the orientation of the slotted portion 11 of the seat. The clamping member 37 fits below the retractor housing 22 and holds it to the retainer 35 and to the springs 26 by conventional fastening means which pass through aligned holes 71, 72 in the clamp member 37, the retainer 35 and in the clamping portion 70 of the retainer.

Referring to FIGURE 6, within the retractor housing 22 at the end remote from the outboard side 12 of the seat, a pair of constant tension spring motors 27 surround spindles 28. The ends of the spring motors 27 pay out and are secured in centrally located slots 29 in clevis 30 which is adapted to slide in the track formed by the walls of the retractor housing 22.

A roller 60 is journalled at the bifurcated end of the clevis 30. The seat belt 15 passes along the track formed by housing 22 and is threaded about the roller 60 and doubles back down the track to exit the retractor. The natural bias of the spring motors 27 pull upon the clevis slide 30, causing the belt 15 to retract.

As shown in FIGURE 8, the movement of the slide 30 in the retraction direction, and hence the retraction of the belt, is limited by the necked down portion 32 at the open end 33 of the retractor housing 22. Tongue member 17 is dimensioned to enter the open end 33 in the retractor housing 22 and to engage the housing walls at the necked down portion 32. When thus engaged, the end of the tongue 17 extends out of the slotted portion 11 in the outboard side 12 of the seat, as described in connection with FIGURE 2.

FIGURE 7 shows the components of the automatic mechanism for locking out the pull of the retractor when in the fully extracted position. It also shows the manner of connection between the retractor housing 22 and the slotted portion 11 in the seat outboard side 12.

The bracket 61 is secured at its arms 50 by rivets upon the outside of the retractor housing 22 and across the mouth of its open end 33. A pair of rollers 51, 52, are journalled upon pins 53 at upward and downward arms 54, 55 of the bracket 61.

Midway between the ends of the arms 54, 55, a pair of notches 49 thereon receive a pin 69 which is held in place by the cover 68 parallel to and between the rollers 51, 52 when it is secured in place upon the bracket.

A plastic backing plate 56 is held by rivets to the bracket 61 at tabs 57 and a plastic cover 68 which contains the slotted opening 11 is secured to the bracket by drive pins through mating holes 58 and 59 in the cover 68 and bracket 61 respectively.

The upward and downward arms 54, 55 of the bracket 61 with rollers 51, 52 and pin 69 are positioned externally of the outboard side 12 of the seat and the cover 68 is fitted over them. The plastic backing plate 56 is positioned against the outboard side 12 between the metal arms 54, 55 and the outboard side 12 to protect the upholstery fabric thereof.

Roller 52 guides the belt 15 into the retractor from the floor anchor 13 and roller 51 guides the belt 15 from the retractor 20 towards the seat cushion. The pin 69, placed at the middle in slotted portion 11, prevents the slide 30 from being pulled out of the retractor when the belt 15 is being fully extracted.

Within the envelope of the seat, the retractor housing 22 is positioned at its open end 33 against the upholstered side of the seat. Bracket arms 50 on the housing 22 have a pair of downwardly disposed tabs 42 thereon which extend below retractor housing 22 so as to provide clearance for a pin 75 which is inserted in an aligned pair of holes 43 in the tabs 42. The locking member 62 is pivotably attached to the bracket 61 by a pair of downwardly disposed tabs 46 having a pair of aligned holes 47 therein through which the pin 75 passes.

The opposite end of the locking member 62 forms a pair of upwardly disposed dog ends 44 through a pair of inclines 45. The retractor housing 22 has a pair of slots 36 near the open end 33 thereof for receiving the dog ends 44 when the locking member 62 is pivoted towards the housing 22. The purpose of these will now be described in connection with the function of the automatic locking mechanism with reference to FIGURES 9 and 10.

An upwards biased flat spring 63 is fastened beneath the retractor housing 22 by conventional fastening means and contacts the locking member 62 on the side of its pivot axis (at pin 75) opposite to the dog ends 44. As a result, the dog ends 44 are normally biased downward. The downward movement of the dog ends 44 is blocked by its contact with the resilient spring arm 64 which is fastened to a structural member of the seat, such as the angle iron 67 of the seat frame. The angle iron 67 is fixed against vertical movement.

FIGURE 9 shows the relative position of the dog ends 44 and the retractor housing 22 in the absence of pressure on the seat. The retractor housing 22 rides secured to the seat springs at a distance above the resilient arm 64 such that the dog ends 44 rest fully below the retractor housing 22 and out of the path of the slide 30 within the housing 22.

When a passenger sits on the seat over the retractor housing 22, the springs to which the housing is secured will move downward under the passenger's weight and the retractor housing 22 will ride downward with them. The bottom of the retractor housing 22 will move to a level below the upward extending dog ends 44 so that the dog ends will protrude through the slots 36 in the housing, into the path of the retractor slide 30 near the mouth of the open end 33 of the retractor housing 22. This condition is shown in FIGURE 10.

The pressure on the seat and the downward movement of the seat spring usually will also cause the retractor housing 22 and the dog ends 44 to ride downward together after the bottom of the retractor housing 22 comes against the flat surface 48 of the locking member 62. The resilient arm 64 will yield downwardly to the extent necessary until the retractor housing 22 comes to rest.

The passenger, who has seated himself upon the seat over the retractor housing, now wishes to fasten the seat belt. He reaches to the outboard side 12 and grasps the buckle tongue 17 where it rests protruding beyond the cover 68 through the slotted portion 11. As he pulls the tongue 17 to him, the belt 15 runs out of the slotted portion 11 from within the retractor housing 22 and changes direction upwardly towards the seat cushion around the upper roller 51. The slide 30 is pulled along with the retractor housing towards the locking member 62 against the pull of the constant tension springs 27, which pull is felt by the passenger. Were the passenger to release the tongue 17 at any point prior to full extraction, the belt would be fully retracted. When the belt 15 is fully extracted from the retractor, the belt will pass generally in-line from the anchor 13 to the seat cushion along the outboard side 12 and across the cover 68. The roller 60 on the slide 30 will be positioned between and just external of the upper and lower rollers 51 and 52 on the bracket 61 within the cover 68. The slide 30 will have moved past the dog ends 44 which lie in its path depressing the dog ends 44 as it encounters the inclines 45. The dog ends 44 will move downward, further depressing the resilient arm 64 until the slide 30 has passed over them, whereupon the dog ends 44 will snap back up behind the slide 30 under the influence of the resilient arm 64. The slide 30 is then locked in the fully extracted position, cutting off the pull on the belt from the constant tension springs 27, which signals the passenger that the belt 15 is fully extracted and ready for use.

So long as the passenger remains on the seat, the belt will remain fully extracted. The passenger may open the buckle as his needs may dictate without fearing its retraction.

When the passenger leaves the seat and removes his weight from the seat springs 26, the springs will move upward and the retractor housing 22 will ride up with them. At first, the dog end will ride upward with the housing 22 under the influence of the resilient arm 64, but shortly the resilient arm 64 will return to its normal unloaded position at which point the bias on the flat spring 63 will prevail and drop the dog ends 44 relative to the housing 22 as the housing continues upward. The dog ends 44 will drop out of the path of the slide 30, freeing the slide to respond to the pull of the constant tension springs 27 which will retract the belt 15. In practice it has been found that the above described retraction is so swift that passengers are unable to catch the belt 15 or tongue 17 in the vehicle door.

Although this invention has been described through the medium of a specific embodiment, it should be understood that various modifications and adaptations will occur to one skilled in the art without departing from the spirit or teachings of this invention.

What is claimed is.

1. A seat belt retractor adapted to be positioned substantially within the envelope of said seat and oriented generally laterally with respect to the forward direction thereof comprising:
  (a) an elongated housing (22) having an opening (33) at one end adapted to communicate with an opening in the side of said seat and having aperture means (36) in the bottom thereof near said open end,
  (b) means (24, 25) for securing said housing to the springs of said seat to move up and down therewith in response to pressure on said seat and for holding said housing in predetermined orientation about its longitudinal centerline,
  (c) a slide (30) positioned within said housing and moveable to a position partially extending from said open end, said slide having means (60) thereon for engaging a seat belt,
  (d) spring means (27) secured to said housing at a distance from said open end and connected to said slide to bias said slide for movement away from said open end,
  (e) a locking member (62) positioned beneath said housing and pivotably attached thereto having projection means (44) thereon adapted to pass into said bottom aperture means to enage said slide for retention thereof in said partially extending position, said projection means having a downward incline (45) thereon in the direction away from said open end, and
  (f) a member (64) adapted to be resiliently secured to a vertically fixed portion of said seat and adapted to operably contact the underside of said locking member to urge said projection means into said bottom aperture means upon the downward movement of said housing.

2. A seat belt retractor according to claim 1, said projection means comprising a pair of dogs thereon spaced apart on said locking member for engaging the rear of said slide.

3. A seat belt retractor comprising:
  (a) elongated track means (22) adapted to move up and down with the springs of said seat in response to pressure on said seat,
  (b) means (24, 25) for securing said track means to said springs,
  (c) a slide (30) slideable along said track means and biased for movement towards one end thereof,
  (d) means attached to and moveable up and down with said track for retaining said slide remote from said one end comprising a member (44) adapted for movement into and out of the path of said slide and biased for movement out of said slide path, and
  (e) resilient means (64) adapted to be connected to a vertically fixed portion of said seat relative to said seat springs and adapted to operably contact said member to urge said member into said slide path upon the downward movement of said track means.

4. A seat belt retractor according to claim 3 in which said member comprises a dog-ended member pivotably attached to and beneath said track means, the dog end (44) thereof having an incline (45) thereon sloping downward in the direction of said one end.

5. A seat belt retractor according to claim 3 in which said track means comprises an elongated housing having an opening (33) at the end thereof opposite said one end and aperture means (36) in the bottom thereof near said open end for passage of said member therethrough.

6. A seat belt retractor according to claim 4 in which said member has a pair of spaced apart dog ends thereon.

7. A seat belt retractor according to claim 3 in which said track means comprises an elongated housing having an opening (33) at the end thereof opposite said one end and aperture means (36) in the bottom thereof near said open end, said member being pivotably attached to and beneath said housing and having a pair of dog ends thereon adapted to pass through said aperture means upon pivoting of said member towards said housing.

8. A seat belt retractor according to claim 3 in which said track means has stop means (32) thereon for limiting the travel of a belt buckle member in the retraction direction.

9. A seat belt retractor according to claim 7 in which said housing has a neck-down portion (32) near said open end for limiting the travel of a belt buckle member through said housing.

10. A retractor according to claim 3 in which said track means is mounted laterally with respect to the forward direction of said seat and within the envelope thereof, the end of said track means opposite said one end being adapted to communicate with an opening through the side of said seat.

11. A retractor according to claim 3 having a cover (68) with an opening (11) therein adapted to be positioned on the outside of said seat at the end of said track means opposite said one end.

12. A retractor according to claim 3 in which said track means has a bracket (61) at the end opposite said one end, said bracket having upper and lower rollers (51, 52) journalled thereon and spaced apart to permit at least a portion of said slide to pass therebetween, means (69) for limiting the travel of said slide through said rollers, the portion of said bracket containing said rollers and said limiting means being adapted to be positioned on the outside of said seat, and a cover (68) having an opening 11 therein and adapted to fit over and be secured to said bracket portion.

13. A seat belt retractor according to claim 3 in which said track means is adapted to be oriented about its longitudinal axis to orient said slide about its longitudinal axis at an angle of between 20° to 45° to the horizontal.

14. A seat belt retractor according to claim 3 in which said track means is adapted to be positioned at the end (33) thereof opposite said one end at an inner face of said seat, said slide being adapted to partially extend from said track through said face to the exterior of said seat, said retaining means being adapted to enter the path of said slide behind said slide with respect to said seat face to retain said slide in said partially extended position.

15. A seat belt retractor according to claim 4 in which said retaining means has a dog end thereon having an incline which slopes downward in the direction of said one end.

16. A seat belt retractor according to claim 4 in which said resilient means comprises an arm adapted to contact the underside of said dog-ended member on the dog side of its pivot axis.

17. A seat belt retractor according to claim 3 in which said securing means comprises a first clamp member (35) adapted to clamp about a rod of said seat springs to hold said clamp to said rod in a predetermined orientation with respect to the horizontal and a second clamp member (37) adapted to hold said track means to said first clamp member.

18. A seat belt retractor according to claim 3 in which said track means has spring means (27) fixed between said slide and said one end, an end of said spring means being attached to said slide for affecting said bias thereon.

19. A seat belt retractor according to claim 18 in which said spring means comprises a pair of constant tension spring motors.

References Cited
UNITED STATES PATENTS

| | | | |
|---|---|---|---|
| 3,128,124 | 4/1964 | Fredericks et al. | 297—388 |
| 3,199,918 | 8/1965 | Nakolan | 297—388 |
| 3,292,744 | 12/1966 | Replogle | 297—388 X |
| 3,330,599 | 7/1967 | Inoue | 297—388 |
| 3,332,720 | 7/1967 | Hansen | 297—388 |
| 3,245,718 | 4/1966 | Jasmer et al. | 297—388 |

CASMIR A. NUNBERG, *Primary Examiner.*

U.S. Cl. X.R.

297—385